(12) United States Patent
Laurienzo et al.

(10) Patent No.: US 9,035,921 B2
(45) Date of Patent: May 19, 2015

(54) VACUUM METALIZED PLATING STYLUS

(71) Applicant: JAKKS Pacific, Inc., Malibu, CA (US)

(72) Inventors: Dominic Laurienzo, Rancho Palos Verdes, CA (US); Rip Lopusnak, Reseda, CA (US); Trina McFarland, Orchard Park, NY (US); Dennis Lee Chi Wai, Hong Kong (CN)

(73) Assignee: JAKKS Pacific, Inc., Malibu, CA (US)

( * ) Notice: Subject to any disclaimer, the term of this patent is extended or adjusted under 35 U.S.C. 154(b) by 67 days.

(21) Appl. No.: 13/921,085

(22) Filed: Jun. 18, 2013

(65) Prior Publication Data

US 2013/0335381 A1    Dec. 19, 2013

Related U.S. Application Data

(60) Provisional application No. 61/661,143, filed on Jun. 18, 2012.

(51) Int. Cl.
*G06F 3/033*    (2013.01)
*G06F 3/0354*    (2013.01)

(52) U.S. Cl.
CPC ....... *G06F 3/03545* (2013.01); *Y10T 29/49982* (2015.01)

(58) Field of Classification Search
None
See application file for complete search history.

(56) References Cited

U.S. PATENT DOCUMENTS

2008/0180411 A1* 7/2008 Solomon et al. ............. 345/179
2013/0176284 A1* 7/2013 Chuang ........................ 345/179

\* cited by examiner

*Primary Examiner* — Nicholas Lee
(74) *Attorney, Agent, or Firm* — Tope-McKay & Associates

(57) ABSTRACT

A metalized plated stylus is described. The stylus includes a pen stem, a metal plating coat adhered to the pen stem, and a conductive rubber stylus tip attached with the pen stem such that the stylus tip is in direct contact with the metal plating coat. Importantly, the metal plating coat is adhered to the pen stem through vacuum metalized plating.

2 Claims, 4 Drawing Sheets

VACUUM METALIZED PLATING STYLUS

CROSS-REFERENCE TO RELATED APPLICATIONS

This is a non-provisional application of U.S. Provisional Application No. 61/661,143, filed on Jun. 18, 2012, entitled, "Vacuum Metalized Plating Stylus."

BACKGROUND OF THE INVENTION (1) Field of Invention

The present invention relates to a touch screen stylus and, more particularly, to a stylus and method for forming the stylus by vacuum metalized plating.

(2) Description of Related Art

Touch screen styluses have long been known in the art. Traditional styluses include a conductive stylus tip attached with a metal barrel. Such stylus are used to touch a touch screen and, due to the conductivity of the tip and metal barrel, provide a ground to the touch screen to allow a user to control the device (such as a smart phone, tablet computer, etc.). While operable, there exists a continuing need for an alternative method for forming such a style.

SUMMARY OF INVENTION

The present invention relates to a touch screen stylus and, more particularly, to a stylus and method for forming the stylus by vacuum metalized plating.

The stylus includes a pen stem, a metal plating coat adhered (e.g., through vacuum metalized plating) to the pen stem, and a conductive stylus tip attached with the pen stem such that the conductive stylus tip is in direct contact with the metal plating coat, In another aspect, a storage connector is attached with the pen stem. The storage connector is adapted to connect with a port on a touch controlled device. For example, the storage connector allows a user to attach the stylus with a pin port of an iPhone or any other touch controlled device. In one aspect, the storage connector is formed of a non-conductive material. Additionally, the pen stem is formed with a slot and the storage connector is attached with the pen stem by being matingly attached with the slot.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a touch screen stylus and, more particularly, to a stylus and method for forming the stylus by vacuum metalized plating. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used fir convenience purposes only and are not intended to imply any particular fixed direction. Instead, they are used to reflect relative locations and/or directions between various portions of an object.

(1) Description

The present invention relates to a stylus that is to be used with a touch screen and a method for forming the same. A traditional stylus includes a stylus tip that is connected with a metal barrel. The present invention improves upon the prior art by providing a light and less costly, yet equally effective, stylus.

Figure 1:
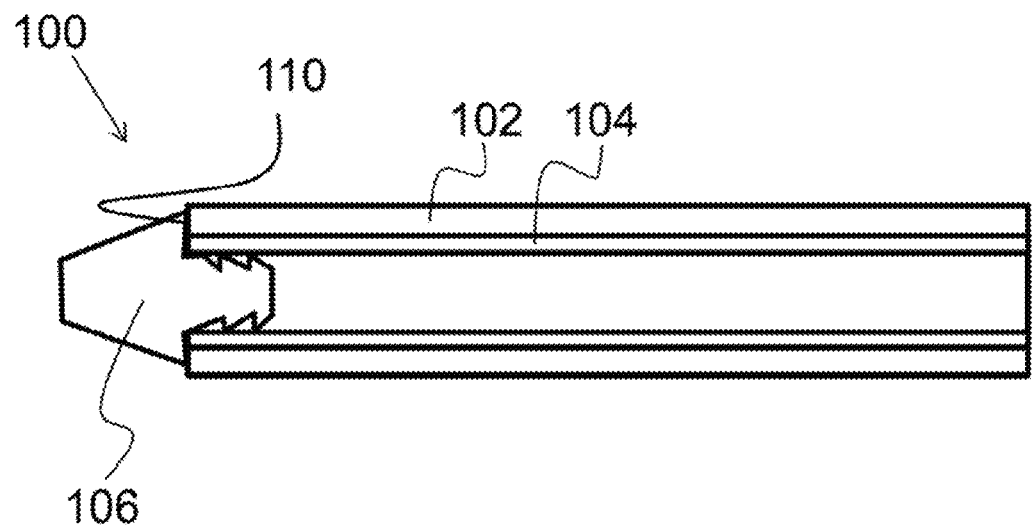
FIG. 1 is a cross-sectional side-view illustration of a stylus according to the present invention.

In doing so, the stylus is formed through a plating process to adhere a thin metal coating on a pen barrel (i.e., pen stem). The thin metal coating is used to provide conductivity between the human hand and stylus tip. An example of a stylus formed according to the present invention is depicted in FIG. 1. FIG. 1 is a cross-sectional, side-view illustration of a stylus 100, showing the stylus 100 as formed of a metal plated 102 pen stem 104 with an electrically conductive stylus tip 106 (e.g. electrically conductive rubber tip). The pen stem 104 can be hollow (as depicted) or any other suitable form, so long as it includes the metal plated coat (or layer) 102 that is directly connected with the conductive stylus tip 106. As a non-limiting example and as depicted in FIG. 1, the conductive stylus tip 106 has a connection portion 110 (e.g., lip or other marking) that is formed to connect with the metal plated coat 102.

The principle of the stylus is using the metal plated 102 pen stem 104 through the electrically conductive stylus tip 106 to transmit the human touch (actually it is the capacity value of human flesh) to the iPad/iPhone touch screen (or any other touch controlled device) that uses capacity detection/sensor to detect finger pointing. The tip 206 is any suitable material that provides for electro-conductance with a touch screen device, a non-limiting example of which includes a silicone conductive rubber tip as is commonly known by those skilled in the art.

The pen stem 104 is formed of any suitable material. As a non-limiting example, the pen stem 104 will be molded in Acrylonitrile butadiene styrene (ABS), which is a common thermoplastic. The pen stem 104 is then plated with the metal coating metal plated 102) using any suitable plating process. As a non-limiting example, the pen will be electroplated using di-electric fluid to discharge metal particles onto the pen surface. Vacuum Metalize Plating (VUM) is another metallization process that uses vaporized metal particles to adhere onto the pen stem 104 in a vacuum chamber. After the pen has been plated, since the plating is from actual metal particles, the pen surface becomes electro-conductive.

Figure 2:
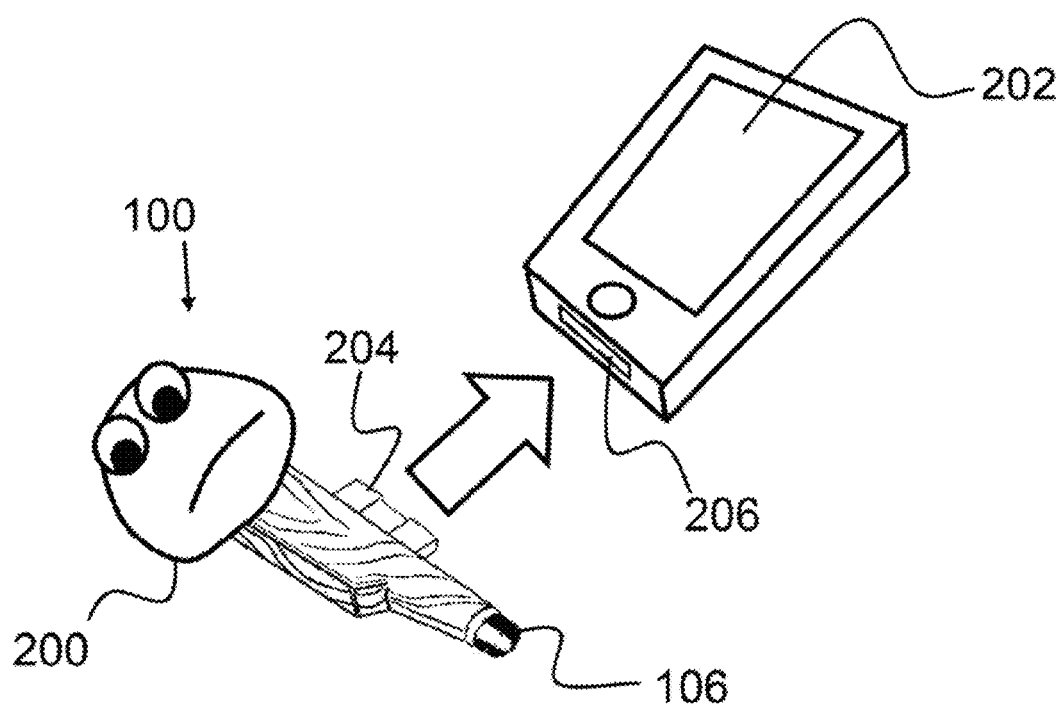
FIG. 2 is an illustration of a stylus according to the present invention.
Figure 3:
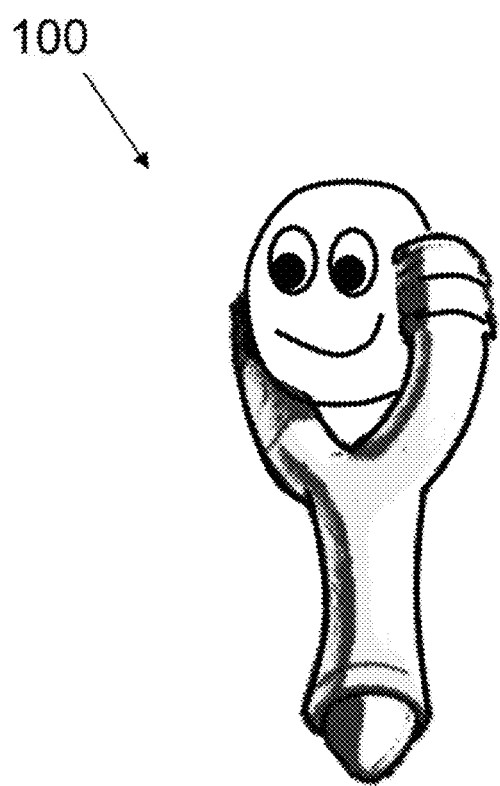
FIG. 3 is an illustration of a stylus according to the present invention.

As shown in FIG. 2, the plated pen can be decorated on top of the plating and will go to final assembly, where the conductive stylus tip 106 and any other decorative features 200 are added. Although not required, any suitable decorative feature 200 can be added. As a non-limiting example, the decorative feature 200 can be a licensed character, such as an Angry Bird™ character that is formed to complement a game that can be played on the touch controlled device 202. The decorative feature 200 is formed of any suitable material, a non-limiting example of which includes being a PVC figure, as illustrated in FIG. 2. As another example, the decorative feature can be the shape of the pen stem and stylus itself. For example and as illustrated in FIG. 2, the pen stem is formed with markings to resemble wood that also complements the Angry Bird™ game. In another aspect, once the pen stem is plated, the plated metal takes on the shape of the pen stem and the desired shape and/or decorative feature. As another non-limiting example and as shown in FIG. 3, the styles 100 and its pen stem can be formed to appear as a slingshot, which, again, also complements the Angry Bird™ game.

As illustrated in FIG. 2, the stylus 100 can be formed to optionally include a storage connector 204. In other words, the stylus 100 can be formed with or without the storage connector 204, as may be desired by the manufacturer or retailer. The storage connector 204 is any suitable mechanism or device that assists the stylus 100 in connecting with the touch controlled device 202 for storage when not in use. As a non-limiting example, the storage connector 204 is a plastic projection that is adapted to connect with the pin connector port 206 or any other port or connector (e.g., Lightening port, 30-pin port, etc.) on the touch controlled device 202. Thus, when not in use, the storage connector 204 can be positioned within and attached with the port 206 of the touch controlled device 202.

Figure 4:
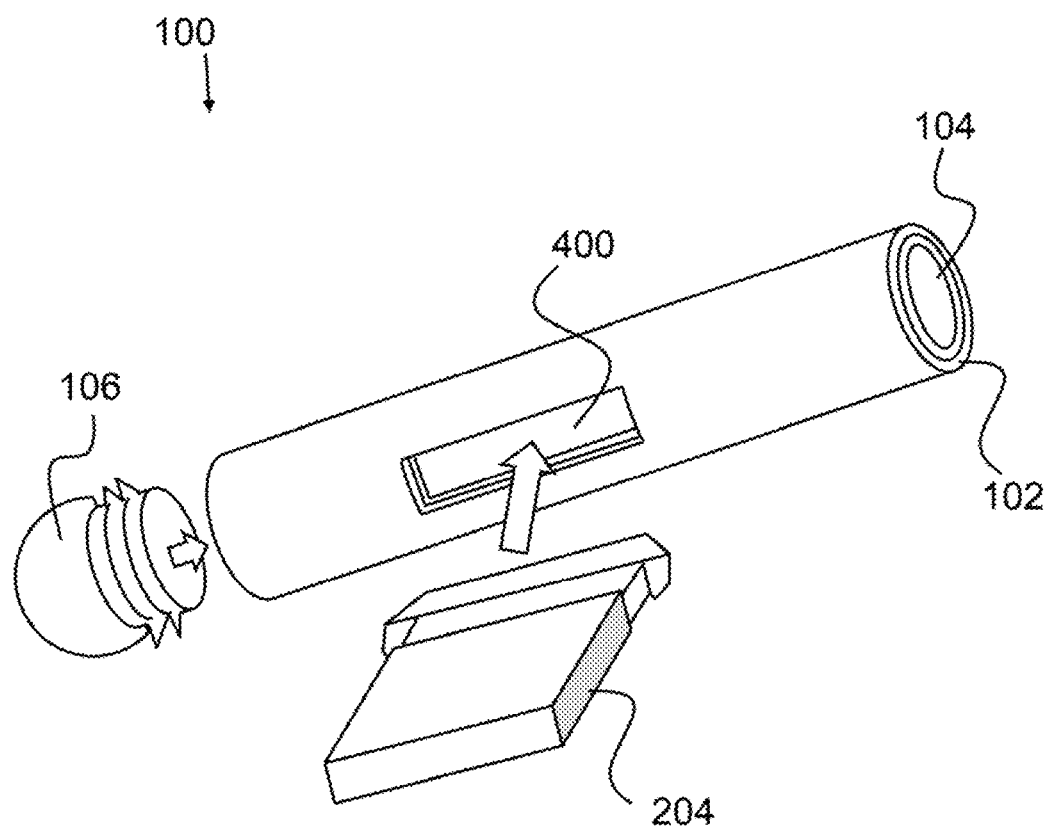
FIG. 4 is an illustration of a stylus according to the present invention.

The storage connector 204 is formed of any suitable material. In one aspect, the storage connector 204 is formed or otherwise attached with the pen stem and plated to be electrically conductive. However, desirably, the storage connector 204 is formed of a non-conductive material, such as plastic (and not plated). Because it may be desirable to form the storage connector 204 out of a non-conductive material, the storage connector 204 can be covered with a mask during the metal plating process (e.g., VUM process). As another non-limiting example and as depicted in FIG. 4, the pen stem 104 can be formed with a slot 400 therethrough. The pen stem 104 can then be plated with the metal coating (i.e., metal plated 102), with the conductive stylus tip 106 and storage connector 204 thereafter added to the stylus 100 (such as being pressed into the pen stem 104 like a plug). For example, the storage connector 204 is attached with the pen stem 104 by being matingly attached with the pen slot 400.

It is important to note that when the conductive stylus tip 106 is added, the contact area between the plated pen and the conductive stylus tip 106 is clean from any decorative paint, glue, or dirt, etc., to ensure best conductivity. Thus, through the metal plating process, the present invention provides an effective, yet relatively inexpensive, stylus.

What is claimed is:

1. A plated stylus, comprising:
a pen stem:
a metal plating coat adhered to the pen stem;
a conductive stylus tip attached with the pen stem such that the conductive stylus tip is in direct contact with the metal plating coat;
wherein the metal plating coat is adhered to the pen stem through vacuum metalized plating;
further comprising a storage connector that is attached with the pen stem; controlled device; and
wherein the storage connector is formed of a nonconductive material.

2. The plated stylus according to claim 1, wherein the pen stem is formed with a slot and the storage connector is attached with the pen stem by being matingly attached with the slot.

\* \* \* \* \*